United States Patent [19]

Logman

[11] Patent Number: 4,964,613
[45] Date of Patent: Oct. 23, 1990

[54] GATE VALVE

[75] Inventor: Timothy M. Logman, Monticello, Ill.

[73] Assignee: Mueller Co., Decatur, Ill.

[21] Appl. No.: 423,155

[22] Filed: Oct. 18, 1989

[51] Int. Cl.$^5$ .............................................. F16K 31/50
[52] U.S. Cl. .................................... 251/267; 251/264;
251/273; 74/424.8 VA
[58] Field of Search ............... 251/264, 266, 267, 268,
251/269, 273, 274; 74/424.8 VA

[56] References Cited

U.S. PATENT DOCUMENTS

| 646,912 | 4/1900 | Lewis | 251/267 X |
|---|---|---|---|
| 675,757 | 6/1901 | Schonheyder | 261/221 X |
| 923,413 | 6/1909 | Davis | 251/273 X |
| 1,014,168 | 1/1912 | Nolan | 251/267 X |
| 1,569,674 | 1/1926 | Pigott | 251/264 X |
| 1,602,443 | 10/1926 | Moyer | 251/267 X |
| 1,664,694 | 4/1928 | Lovvorn | 251/273 X |
| 2,031,151 | 2/1936 | Eulberg | 251/267 X |
| 2,125,942 | 8/1938 | McCarthy | 74/424.8 VA |
| 2,186,833 | 1/1940 | Iler | 251/274 X |
| 2,297,137 | 1/1942 | Fennema | 74/424.8 VA |
| 2,996,075 | 8/1961 | Deimer et al. | 251/264 X |
| 3,190,611 | 6/1965 | Prescott et al. | 251/266 |

FOREIGN PATENT DOCUMENTS 178206  8/1886  France .

Primary Examiner—John Rivell
Attorney, Agent, or Firm—Cushman, Darby & Cushman

[57] ABSTRACT

In a gate valve, the valve member is connected to an operating stem which extends upwardly through an opening in the housing for connection to a hand wheel rotatably carried by a yoke through which a portion of the stem extends; rotation of the hand wheel is transferred to linear motion of the valve stem through a split pair of threaded nut members the upper one of which is rotatably engaged with the hand wheel and the lower one of which is rotatably carried in a bore of the support yoke through which a threaded portion of the stem extends; the upper and lower nut members are intergaged to prevent relative rotation therebetween and are of identical configuration.

5 Claims, 2 Drawing Sheets

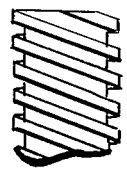
*Fig.2.*
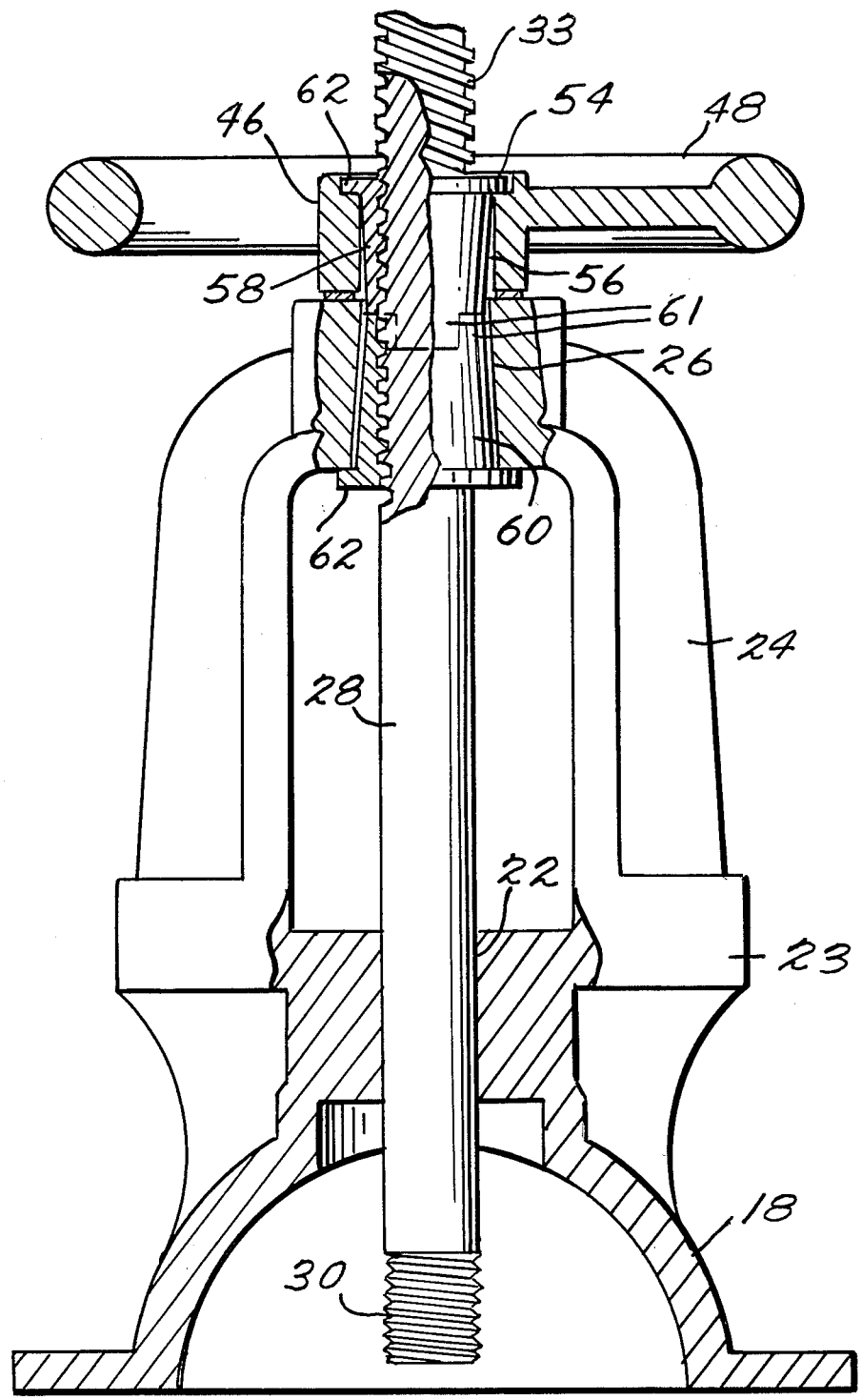

GATE VALVE

BACKGROUND AND SUMMARY OF THE INVENTION

The present invention relates to improvements in gate valve assemblies and, more particularly, to an improvement in the operating apparatus for a gate valve of the type having an operating stem which extends upwardly through the valve housing and through a support yoke for cooperation, typically, with a hand wheel where rotation of the hand wheel will be translated into rectilinear motion of the valve stem whereby the valve element will be moved between opened and closed positions depending on the direction of rotation of the hand wheel.

In the manufacture of fluid control systems, such as municipal water systems, fire protection systems including sprinklers as well as irrigation systems, the various flow control elements such as gate valves and the like must often reliably operate after long periods of non-use. For example, in municipal water systems, many of the flow control devices such as gate valves will normally remain open and need only be operated between their normally opened and their closed positions upon the occurrence of a leak in the system requiring the shut down of flow through the system to permit repair work to commence. Similarly, in fire protection systems such as building sprinkler apparatus, the various valve systems employed will only be put in operation during or after an emergency which is usually an infrequent event. In other fluid distribution systems, operation of large gate valves, for example, would normally only be effected during the periodic maintenance of the system.

As a consequence, in such systems, it is essential that the valve operating mechanisms be so constructed as to assure reliable operation when needed. In the case of fire protection systems it is also necessary that the systems be easily placed into service despite the long periods of non-use that the systems may experience.

In connection with large scale flow control devices such as gate valves that are stem actuated to move a valve element between an open and close position relative to a flow passage, the critical connections of the valve stem to a drive mechanism such as a hand wheel have employed a number of different assemblies for transmitting the rotary power of the hand wheel to the operating stem of the valve member itself. Some of these require frequent lubrication to assure smooth operation while others have been relatively difficult and expensive to assemble thus contributing to their high cost in even a mass production assembly line. In other arrangements, particularly those where the valve apparatus will lie idle for long periods of time, relatively complicated safety mechanisms have been employed to minimize the possibility of damage to the valve stem or valve element where resistance to movement is encountered when an attempt is made to operate the valve. It sometimes occurs that such safety mechanisms prevent operation of the valve by disengaging the stem raising mechanism so that little or no damage would result to the valve elements when torque is applied to the operating device. This is a particularly troublesome disadvantage in the use of valves employed in fire protection systems.

SUMMARY OF THE INVENTION

The present invention avoids the foregoing difficulties by providing an improved connection between the hand wheel of a rising stem type gate valve and the threaded portion of the stem and one which will be significantly less expensive to produce and yet which will reliably operate over long periods of time and will provide a secure safety mechanism to prevent damage to the valve element where resistance to movement of the valve stem is encountered upon operation of the hand wheel.

In a preferred embodiment, in a valve assembly of the type having a yoke supported on the valve housing where the valve stem extends through a bore provided in the yoke, two identically shaped nut elements are provided one of which is carried by the hub of the hand wheel so as to be rotatable therewith and the other of which is carried by the valve stem and is disposed in the bore of the yoke through which the valve stem extends. Each of the nut elements is internally threaded to cooperate with the threaded portion of the valve stem and each is provided with interengaging tangs or teeth to prevent relative rotation between the nut elements. At their ends opposite the tangs, each of the nut elements is provided with a flange with one of the flanges of one of the nuts which is carried by the hub serving as a safety device which will yield when resistance to rotation above a selected amount is encountered. With this arrangement, considerable manufacturing cost reductions can be effected as the nut elements are identical thus avoiding the expense of manufacturing separate parts. In addition, assembly and disassembly of the structure will be greatly simplified.

The foregoing and other advantages will become apparent as consideration is given to the following detailed description taken in conjunction with the accompanying drawings, in which:

BRIEF DESCRIPTION OF THE DRAWINGS

FIG. 2 is a detailed view, partly in section, of the upper portion of the valve assembly of FIG. 1.

DETAILED DESCRIPTION OF THE INVENTION

Figure 1:
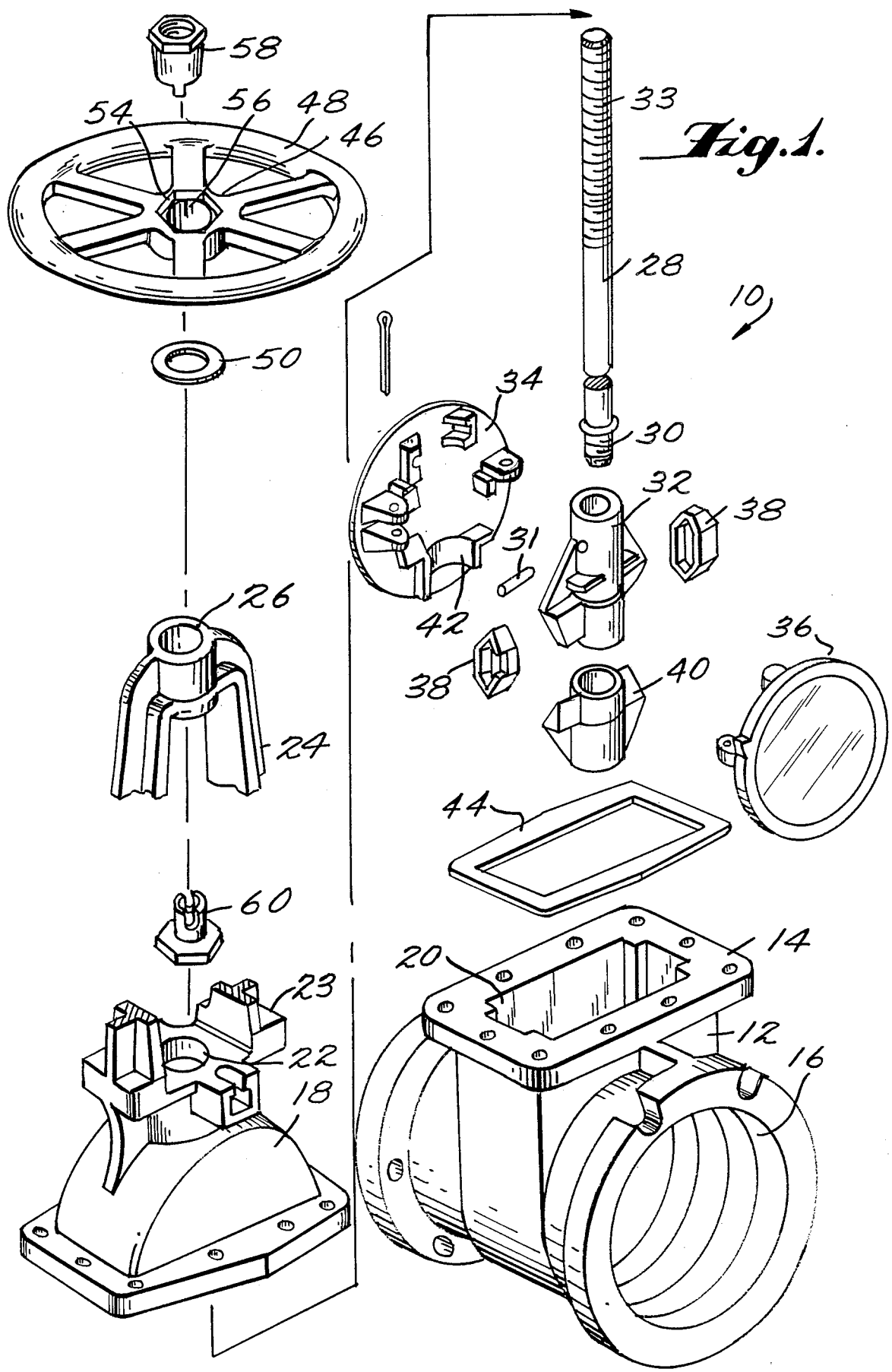
FIG. 1 is an exploded view of the qafe valve of the present invention.

Referring now to the drawings wherein like numerals designate corresponding parts throughout the several views, there is shown in FIG. 1 an exploded view of a gate valve 10 of an outside or external stem and yoke type. In the illustrated gate valve 10, certain elements unnecessary to an understanding of the present invention are not illustrated but will be apparent to those skilled in this art.

As shown, the valve 10 includes a housing 12 having a flow passage 16, the ends of which are adapted to be connected to a fluid conduit. Intermediate its ends, the housing 12 is provided with a passage 20 surrounded by a connecting flange 14. The passage 20 is adapted to receive conventional valve elements as briefly described below. When assembled, a bonnet 18 has its lower end secured to flange 14 with a joint seal 44 therebetween. The bonnet is provided with an opening 22 on each side of which the legs of a yoke 24 extend as shown. The yoke 24 is provided adjacent its apex with a bore or passage 26 for receiving the valve operating stem 28 and split nuts elements 60.

The valve operating stem 28 at its threaded lower end 30 will be connected to a wedge nut 32 which, in turn, will support a valve disc 34 in a conventional manner in cooperation with a disc member 36 which is mounted on the opposite side of the wedge nut 32. Side spreaders 38 are employed in the conventional manner to maintain the spacing between the valve discs 34 and 36. A bottom wedge member 40 will be connected to the lower end of the top wedge nut 32 and may serve as a bearing surface for engaging the accurate bearing surface 42 on the rear face of the disc 34.

As noted above, a joint gasket 44, as is conventional, will be interposed between the bonnet 18 and flange 14 of housing 12 in assembly of the gate valve.

It will be understood by those skilled in this art, that other valve assemblies to effect control of flow through the passage 16 may be employed and that the foregoing are merely illustrative.

The upper end of the valve stem 28 has a threaded portion 33 over slightly half the length of the valve stem 28. It will be appreciated that the length of the threaded portion 32 may vary depending upon the dimensions of the gate valve with which a particular valve operating stem 28 is employed and that the illustrated embodiment is merely one example.

In the conventional as well as the illustrated embodiment, the valve elements 28-40 are first assembled. For example, the stem 28 is attached to the top wedge nut 32 by a pin 31. Additional pins, not shown, join the two discs 34 and 36, capturing the top wedge nut 32, the two side spreaders 38 and the bottom wedge nut 40. The assembly is then inserted in the housing 12 and then the bonnet 18 and yoke 24 are set in place with the valve operating stem 28 extending through openings 22 and 26. An internally threaded nut (not shown) in one conventional structure, would then be threaded onto portion 33 of the stem 28 and inserted into the passage 26 and yoke 24. Another internally threaded nut would then be threaded down the stem 28 and keyed to the hub 46 of a hand wheel 48 so that rotation of the hand wheel 48 would effect rotation of the upper nut and result in raising and/or lowering of the stem 28 in a direction parallel to the lonqitudinal axis of the stem 28 dependinq upon the direction of rotation of the hand wheel 48. A washer 50 may usefully be interposed between the lower surface of the hub 46 and the upper surface of the yoke 24 surrounding the passage 26. In the conventional devices, a retaining nut 52 would also be threaded on the upper end of the valve operating stem 28 to prevent separation of the hand wheel 48 from the valve operating stem 28.

While the foregoing arrangement for conventionally connecting the hand wheel to the valve operating stem can be reliably operated, the connection of the hand wheel by the use of a key or pin to connect the hub of the hand wheel to the upper nut has required extra manufacturing steps which it is the object of the present invention to avoid while still providing a yieldable connection between the hand wheel and valve operating stem 28.

With reference now to FIG. 2, according to the present invention, the hand wheel 46 is provided at its upper end with a hexagon or non-round shaped recess 54 surrounding the upper end of the through opening 56 in the hub 46.

According to the present invention, a split nut is employed in the hub and passage 26 having an upper and lower nut members 58, 60, respectfully. Each of the nut members 58 and 60 are identically shaped and, as illustrated in FIG. 2, have slightly tapered exterior surfaces and are provided at one end each with a hexagonally shaped flange 62 or a shape to mate with the recess 54. At the opposite end of each nut member, a pair of diametrically spaced tangs are provided whereby, in the assembled relation as illustrated, the tangs 61 of each of the nut elements 58 and 60 will be interengaged. The interior bores of each of the nut elements 58 and 60 ar threaded to cooperate with the threaded portion 33 of the valve operating stem 28.

With this arrangement, rotation of the hand wheel 48 will be transmitted through the flange 62 of the upper nut element 58 and through the interengaging tang 61 to the lower nut element 60. With this structure, extended engagement of the threaded portion 33 of the stem 28 is provided thereby affording increased strength and smoothness of operation.

By making the hexagon shaped flange 62 sufficiently thin, and therefore more yieldable than other elements of the gate valve, damage to the valve elements can be prevented as the flange will cease to transmit rotation of the hand wheel when resistance to movement of the stem 28 exceeds a predetermined amount. Thus, freeing of the valve elements can be effected before any serious damage is caused. If needed, in an emergency, the hand wheel can be disconnected from the stem 28 and the lower nut element 60 which has an identically shaped hexagon flange 62 substituted for the failed upper nut element 58 as these elements are identically configured.

Having described the invention, it will be apparent to those skilled in this art that various modifications may be made thereto without departing from the scope of this invention as defined in the appended claims.

What is claimed is:

1. In a valve apparatus of the type including a valve housing having a through passage, a valve member mounted for movement relative to said passage between an open position where flow through the passage is permitted and a closed position where flow through the passage is prevented, operating means for said valve member comprising a support means carried on the exterior of said housing, a valve stem having a longitudinal axis, a threaded portion adjacent one end thereof and another portion connected to said valve member so that movement of said valve stem relative to said support means effects movement of said valve member between said open and closed positions, said support means further comprising a bore having a longitudinal axis with said threaded portion of said valve stem extending through said bore, actuating means for moving said stem relative to said bore in a direction parallel to said longitudinal axis of said bore, said actuating means including a rotatable member disposed exteriorly of said bore and surrounding said valve stem, a first nut means operatively connected to said rotatable member so as to be rotatable therewith, a second nut means disposed in said bore and carried on said valve stem, said first and second nut means having interengaging means preventing relative rotation therebetween and each having threaded interior portions for threadly engaging adjacent sections of said threaded portion of said valve stem, said first and second nut means having each first and second ends with the second ends of said first and second nut means having said interengaging means thereon, said interengaging means comprising tangs extending from said respective second ends of said first and second nut means.

2. The invention as claimed in claim 1 wherein said first ends of said first and second nut means each includes flange means and said rotatable member includes a hub having a central opening extending from one side of said hub means to the opposite side thereof with said one side of said hub means having a recess for receiving said flange of a said nut means.

3. The invention as claimed in claim 3 wherein said flange and said recess are complementarily shaped whereby rotation of said hub means will be transmitted through said flange to said first nut means.

4. The invention as claimed in claim 3 wherein said flange is yieldable upon resistance to rotation of said rotatable member being experienced in excess of a predetermined value.

5. The invention as claimed in claim 1 wherein said first and second nut means are identically shaped.

* * * * *